(12) United States Patent
Gonzalez

(10) Patent No.: US 9,004,441 B2
(45) Date of Patent: Apr. 14, 2015

(54) SYSTEM FOR SECURING EQUIPMENT

(71) Applicant: Oscar Gonzalez, Olmito, TX (US)

(72) Inventor: Oscar Gonzalez, Olmito, TX (US)

(*) Notice: Subject to any disclaimer, the term of this patent is extended or adjusted under 35 U.S.C. 154(b) by 8 days.

(21) Appl. No.: 13/863,152

(22) Filed: Apr. 15, 2013

(65) Prior Publication Data

US 2014/0308068 A1 Oct. 16, 2014

(51) Int. Cl.
*F16M 13/00* (2006.01)
*F16B 2/06* (2006.01)

(52) U.S. Cl.
CPC ........................ *F16B 2/065* (2013.01)

(58) Field of Classification Search
USPC ............. 248/500, 552, 71, 73, 87, 156, 181, 248/501, 505, 506, 551, 49, 516; 70/181, 70/227
See application file for complete search history.

(56) References Cited

U.S. PATENT DOCUMENTS

| | | | | |
|---|---|---|---|---|
| 1,267,305 A * | 5/1918 | Balcom | ........................... | 248/87 |
| 1,402,725 A * | 1/1922 | Pippen | ........................... | 70/227 |
| 1,865,989 A * | 7/1932 | Wilber et al. | ................... | 248/87 |
| 1,878,100 A * | 9/1932 | Bossert | ...................... | 246/415 R |
| 2,098,805 A * | 11/1937 | Huntington | ................... | 248/317 |
| 2,106,956 A * | 2/1938 | Nakamura | ...................... | 248/49 |
| 2,113,083 A * | 4/1938 | Height | ........................... | 248/49 |
| 2,300,375 A * | 10/1942 | Turner | ........................... | 52/150 |
| 2,550,001 A * | 4/1951 | Button | ........................... | 248/49 |
| 3,545,839 A * | 12/1970 | Hadley | ........................... | 359/553 |
| 3,603,540 A * | 9/1971 | Gouge et al. | ...................... | 248/96 |
| 3,678,717 A | 7/1972 | Eaton | | |
| 3,751,866 A * | 8/1973 | Renchen | ........................... | 52/149 |
| 3,809,348 A * | 5/1974 | Di Laura | ........................... | 248/49 |
| 3,944,079 A | 3/1976 | Boslough | | |
| 3,996,775 A | 12/1976 | Waldron | | |
| 4,064,668 A * | 12/1977 | Carter | ........................... | 52/295 |
| 4,125,237 A * | 11/1978 | Hagins | ........................... | 248/49 |
| 4,545,557 A * | 10/1985 | Rogers | ........................... | 248/516 |
| 4,553,739 A * | 11/1985 | Baines | ........................... | 256/23 |
| 4,595,165 A * | 6/1986 | Klingensmith et al. | ...... | 248/539 |
| 4,803,858 A | 2/1989 | Parker | | |
| 4,825,671 A * | 5/1989 | Wu | ........................... | 70/238 |
| 5,035,406 A * | 7/1991 | Sellers et al. | ................... | 267/48 |
| 5,193,366 A | 3/1993 | Brinkman | | |
| RE35,677 E * | 12/1997 | O'Neill | ........................... | 248/551 |
| 5,784,907 A * | 7/1998 | Hu et al. | ........................... | 70/203 |
| 5,855,129 A * | 1/1999 | Warren et al. | ................... | 70/234 |
| 6,082,697 A * | 7/2000 | Grunfeld | ........................... | 248/508 |
| 6,142,428 A * | 11/2000 | Kamata et al. | ............... | 248/68.1 |
| 6,272,798 B1 * | 8/2001 | Cockman | ........................ | 52/155 |
| 6,318,941 B1 * | 11/2001 | Guenther | ...................... | 411/342 |
| 6,418,685 B1 * | 7/2002 | Oliver et al. | ................. | 52/293.3 |

(Continued)

*Primary Examiner* — Nkeisha Smith
(74) *Attorney, Agent, or Firm* — Andrew W. Chu; Craft Chu PLLC

(57) ABSTRACT

The system for securing equipment includes a locking device attached to equipment to be secured, a plurality of fasteners, and an anchoring device. The locking device can be a U-bolt with threaded ends to attach to a backflow valve of a sprinkler system or locking bolts attached to a park bench or barbecue grill. Each fastener has a first surface with a first threaded hole in alignment with the locking device and a second surface orthogonal to the first surface with a second threaded hole aligned with anchoring device. The anchoring device can be a flat bar fixedly attached to the fasteners at one connector end and permanently mounted in place at an anchoring end. Each fastener has an L-shape, so that a first surface engages the locking device and opposing second surfaces engage the anchoring device. A concrete plug for outdoor use holds the anchoring end in place for permanency.

13 Claims, 3 Drawing Sheets

(56) References Cited

U.S. PATENT DOCUMENTS

| | | |
|---|---|---|
| 6,843,083 B2 | 1/2005 | Smith et al. |
| 6,871,455 B1 * | 3/2005 | Cockman et al. ............... 52/165 |
| 7,052,058 B2 * | 5/2006 | Olinski ........................... 294/59 |
| 7,455,277 B2 * | 11/2008 | Bishop et al. ................ 248/552 |
| 7,866,570 B2 * | 1/2011 | Griffin ............................. 239/1 |
| 8,052,098 B1 * | 11/2011 | Kowaleski ...................... 248/49 |
| 2002/0113173 A1 * | 8/2002 | Bass ............................... 248/62 |
| 2004/0011096 A1 * | 1/2004 | Quinn et al. .................... 70/234 |
| 2008/0078218 A1 * | 4/2008 | Bishop et al. ................... 70/181 |
| 2009/0071093 A1 * | 3/2009 | Hidajat et al. .................. 52/700 |
| 2011/0174023 A1 * | 7/2011 | George et al. .................... 70/19 |

\* cited by examiner

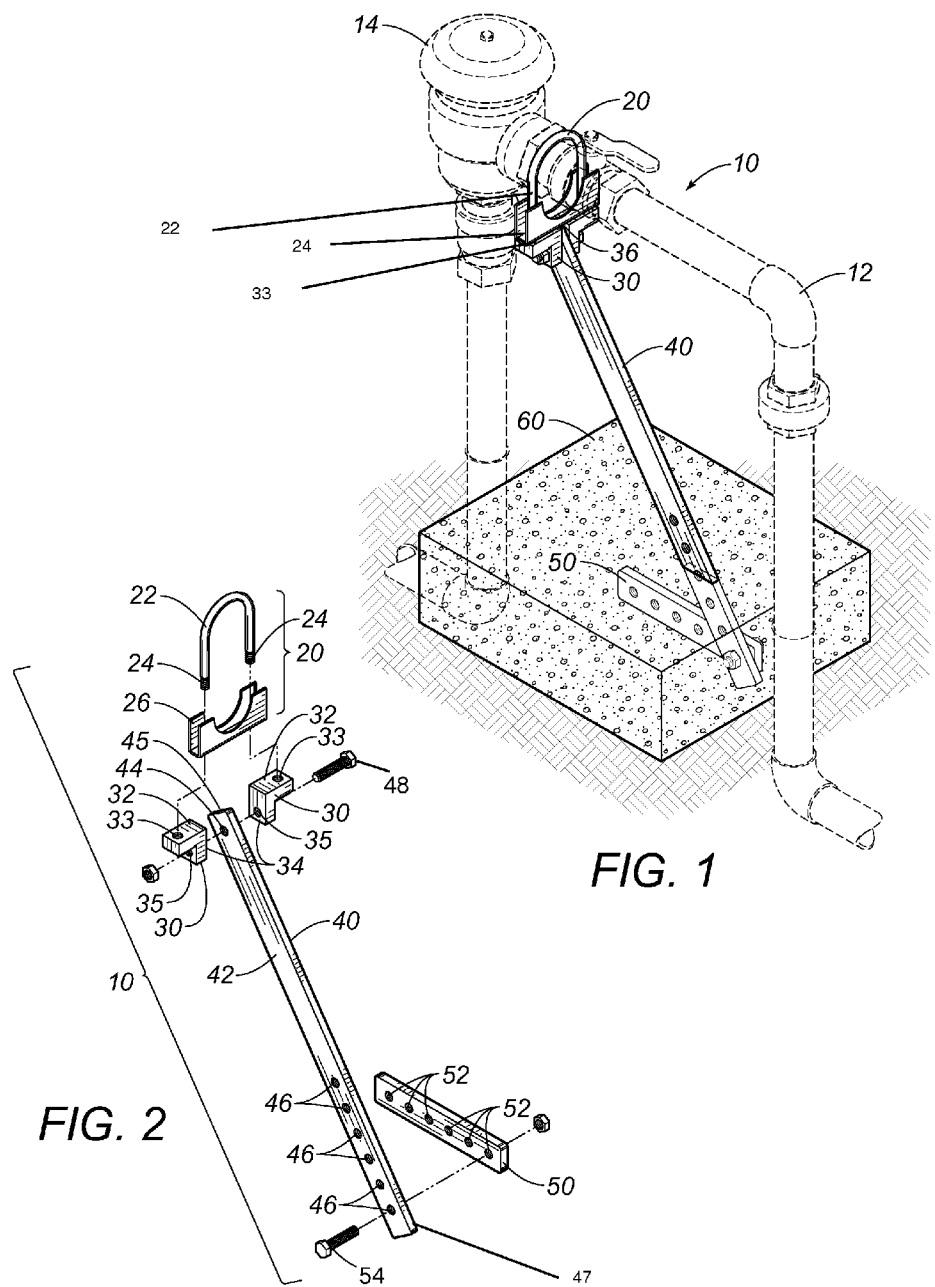

SYSTEM FOR SECURING EQUIPMENT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a system for securing equipment. More particularly, the present invention relates to devices for preventing theft of outdoor equipment, while allowing access to the equipment for inspection and maintenance.

2. Description of Related Art Including Information Disclosed Under 37 CFR 1.97 and 37 CFR 1.98.

Padlocks are prior art technology used to protect against theft, vandalism, unauthorized use, and tampering. These portable devices have a body, a shackle and locking mechanism. The shackle is usually a U-shaped loop, which wraps around the item to be secured. The end of the shackle inserts into the body, where the locking mechanism fixes the shackle in place relative to the body. Locking mechanisms include tumblers and rotating disks. The body prevents access to the shackle and locking mechanism so that the padlock cannot be disabled.

Prior art padlocks are not suitable for all situations. For larger equipment and outdoor equipment, the shackle of the padlock is not effective because the shackle may be too small to wrap around equipment of that size. Also, the padlock could be exposed to tampering. Alternatively, the padlock is used to secure a chain around the larger equipment, wherein the padlock becomes a removable link in the chain. The prior art has developed other systems to perform the locking function, while addressing the problems associated with securing outdoor equipment.

U.S. Pat. No. 3,678,717, issued to Eaton on Jul. 25, 1972, discloses a locking device that restrains a spigot and hose. The device functions by way of a U-shaped guard. The guard is wide and flanged so that, when placed over the connection between the hose and spigot, the guard covers both the hose and spigot and prevents any access to the connection. A padlock is used to lock the guard. The guard protects the spigot and hose from tampering, but there is no easy access without the key to the padlock.

U.S. Pat. No. 6,082,697, issued to Grunfeld on Jul. 4, 2000, discloses a system and method for anchoring and preventing unauthorized movement of an outdoor goal, such as a soccer goal. A post is attached on one end to an auger and on the opposing end to a vertically aligned U-shaped bracket. The U-shaped bracket includes a diameter wide enough to accept the lower frame of the intended goal. The brackets ends extend up past the lower frame of the goal. The bracket still requires a padlock in combination with another structure, instead of a chain.

United States Patent Application No. 2008/0078218, published for Bishop, et al. on Apr. 3, 2008, discloses a system and method of securing piping using an enclosed system of tubes. An enclosure prevents unauthorized disassembly or tempering, but there is no access to the valve with the enclosure engaged. This patent application was allowed as U.S. Pat. No. 7,455,277 covering the particular structures forming the enclosure, including a padlock to secure the cover to the enclosure.

United States Patent Application No. 2011/0174023, published for George, et al. on Jul. 21, 2011, discloses a system and method for clamping and locking wires. The system utilizes a U-bolt passed through a locking clasp. The clasp is designed to restrict the diameter of the U-bolt when the bolt is engaged with lockable nuts. The extended members of the U-bolt are threaded so as to accept locking nuts. When engaged, the U-bolt and clasp are fixed around a wire by passing the extended, threaded members of the U-bolt through the respective portions of the clasp. Lockable bolts are then threaded on the extended members of the U-bolt and locked in place. The opposing and unthreaded ends of the lockable bolts contain eyes through which the shaft of a padlock may be passed, or a bolt, threaded on one end and with a wide diameter on the other, may be fixed to prevent unauthorized access.

It is an object of the present invention to provide a system for securing equipment.

It is another object of the present invention to provide embodiments of the system for securing equipment for large equipment.

It is another object of the present invention to provide embodiments of the system for securing equipment intended to remain outdoors.

It is still another object of the present invention to provide embodiments of the system for securing equipment, which allows access to the equipment for inspection and maintenance.

It is another object of the present invention to provide embodiments of the system for securing equipment intended to remain indoors.

It is still another object of the present invention to provide embodiments of the system for securing equipment with fasteners which permanently connect a locking means and an anchoring means.

These and other objectives and advantages of the present invention will become apparent from a reading of the attached specifications and appended claims.

SUMMARY OF THE INVENTION

Embodiments of the present invention include a system for securing equipment, including a locking means, a plurality of fasteners, and an anchoring means. The locking means is attached to the equipment to be secured, such as a backflow preventer of a sprinkler system, a park bench or a barbecue grill. The equipment could also be located indoors. Each fastener has a first surface and a second surface. The first surface is in alignment with the locking means, and the second surface is orthogonal to the first surface and in alignment with the anchoring means. The first surface has a first threaded hole, and the second surface has a second threaded hole. The first threaded hole engages the locking means, and the second threaded hole engages the anchoring means at a right angle from the first surface. Each fastener can be L-shaped.

In embodiments of the invention, the locking means is comprised of a U-bolt with locking bolt ends. The U-bolt wraps around the equipment to be secured, which allows inspection of equipment without removal of system and easy access to parts of the equipment. There can also be a collar mounted across the U-bolt to completely wrap the equipment across the open end of the U-bolt. The locking bolt ends face downward and threadedly engage respective fasteners at respective first threaded holes on first surfaces. The fasteners are oriented to form a connection space between second surfaces of each fastener. The anchoring means fits within the connection space between fasteners. A connector bolt extends through the fasteners and the anchoring means to fixedly attach the anchoring means to the locking means and equipment. Each connector bolt cannot be unscrewed.

Embodiments of the anchoring means include a flat bar member with a connector hole on a connector end. The connector hole is aligned with the second threaded holes of the second surfaces of the fasteners, so that a connector bolt holds the fasteners to the anchoring means. The anchoring means also includes an anchor hole at an anchoring end opposite the connector end. The anchoring end is permanently mounted in place. Poured concrete surrounds the anchoring end and sets through the anchor hole to fix the anchoring means in place. Thus, the fasteners, locking means, and equipment to be secured are similarly fixed in place. In some embodiments, a stabilizing bar is bolted to the anchor hole. The stabilizing bar is another longitudinal flat bar, which can have mounting holes. The stabilizing bar and mounting holes can be covered in concrete for a stronger mounting in concrete. For indoor application other permanent fixing can hold the anchoring end in place permanently, such as attachment to pipes or a heavy appliance, such as a gun safe.

The locking means has alternative embodiments for securing different types of equipment. The equipment may not be compatible for a U-bolt, so a plurality of locking bolts can be used. Examples include a park bench or an outdoor barbecue grill. The equipment to be secured should have a locking surface with a plurality of locking holes. The locking bolts threadedly engage the fasteners through the locking surface and locking hole, attaching the equipment to the fasteners. The fasteners can now be aligned with second surfaces forming the connection space for the anchoring means. The connector end attached to the fasteners and the anchoring end is permanently mounted, securing the equipment.

BRIEF DESCRIPTION OF THE DRAWINGS

FIG. 1 is a schematic view of an embodiment of system for securing equipment outdoors.

FIG. 2 is an exploded perspective view of the embodiment of the system for securing equipment as shown in FIG. 1.

DETAILED DESCRIPTION OF THE DRAWINGS

Figure 3:
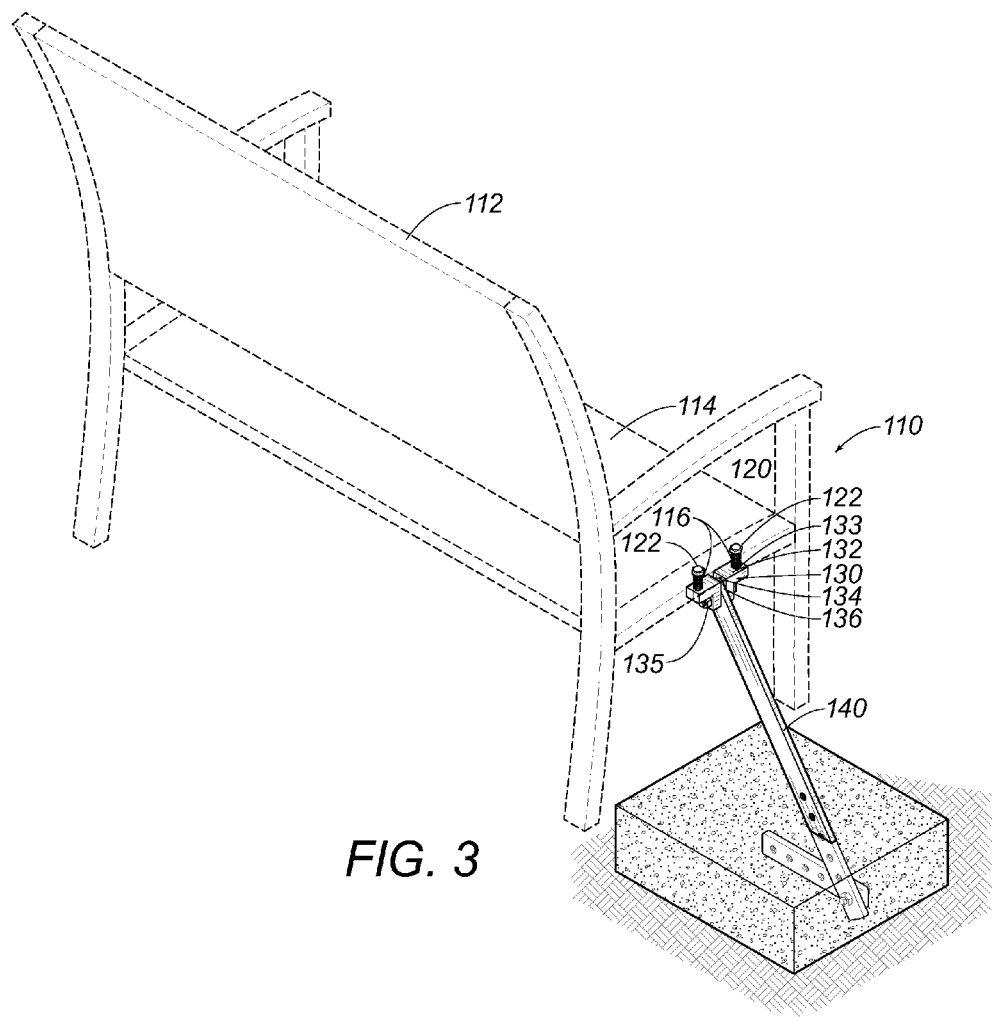
FIG. 3 is a schematic view of an alternative embodiment of the system for securing equipment, showing the equipment as a park bench.

Referring to FIGS. 1-2, there is the system 10 for securing equipment. The equipment can be located outdoors, such as the sprinkler system 12 with a backflow preventer 14 in the embodiment of FIGS. 1-2. The backflow preventer 14 is expensive equipment with high resale value as scrap metal, so it is a common need to protect this device. It is also important to allow access to the sprinkler system 12 overall for maintenance and inspection. Embodiments of the present invention achieve this balance between securing against theft, while allowing access with sets and sets of keys and combinations. A public works or parks and recreation department would have several hundred sprinklers to inspect, and individually keyed locks would be a very inconvenient and inefficient. In alternate embodiments, other outdoor equipment, such as park benches, soccer goals, and barbecue grills, can be secured. In further alternative embodiments, indoor equipment can be secured, such as heavy appliances or a gun safe.

FIGS. 1 and 2 show the system 10 including a locking means 20, a plurality of fasteners 30, and an anchoring means 40. The locking means 20 is attached to the equipment to be secured. The fasteners 30 connect the locking means 20 to the anchoring means 40. FIGS. 1 and 2 show the locking means 20 as a U-bolt 22 with locking bolt ends 24. The U-bolt 22 wraps around the equipment 14 to be secured, and the locking bolt ends 24 face downward. In some embodiments, a collar 26 is mounted across the U-bolt 22. The collar 26 also wraps around the equipment 14 to be secured and across an open end of the U-bolt 22. The locking bolt ends 24 are threaded. The U-bolt 22 can accommodate larger equipment than a regular padlock, and the optional collar 26 provides complete coverage of the equipment to reduce tampering.

The plurality of fasteners 30 are attached to the locking means 20. In one embodiment, the locking bolt ends 24 threadedly engage two respective fasteners 30. Each fastener 30 has a first surface 32 in alignment with the locking means 20 and a second surface 34 orthogonal to the first surface 32. The first surface 32 has a first threaded hole 33, and the second surface 34 has a second threaded hole 35. As shown in the embodiments of FIG. 2, the first and second threaded holes 33, 35 are oriented orthogonal to each other. The use of two fasteners 30 are shown as one embodiment of the invention, and other numbers of fasteners 30 may be possible.

Each fastener 30 threadedly engages the locking means 20 on a first surface 32 through the first threaded hole 33. FIGS. 1 and 2 show the embodiment, wherein the locking bolt ends 24 threadedly engage a respective fastener 30. Each locking bolt end 24 threadedly engages a first threaded hole 33 on a first surface 32 of each fastener 30 so that the threads of each locking bolt end 24 are covered within the first threaded hole 33. Each locking bolt end 24 is within a respective first threaded hole 33. The fasteners 30 prevent the locking means 20 from being unscrewed because the threaded surface is not exposed. Each fastener 30 on each locking bolt end 24 also has a respective second surface 34 facing each other, and these second threaded holes 35 of each fastener 30 are in alignment with each other. A connection space 36 is formed between second surfaces 34 of each fastener 30 for alignment of the anchoring means 40. In embodiments of the present invention, each fastener 30 is L-shaped, so that each fastener 30 is placed back to back on sides of the anchoring means 40, and the connection space 36 is defined by the second surfaces 34 of the fasteners 30.

Embodiments of the present invention also show the anchoring means 40 in FIGS. 1 and 2. The anchoring means 40 is fixedly attached to the plurality of fasteners 30. The anchoring means 40 engage second threaded holes 35 on second surfaces 34 of each fastener 30. In some embodiments, the anchoring means 40 is comprised of a flat bar member 42 with a connector hole 44 on a connector end 45 and an anchor hole 46 on an anchoring end 47. The anchoring means 40 is positioned between the fasteners 30 within the connection space 36 with the second surfaces 34 of each fastener 30 abutted against the anchoring means 40. The connector hole 44 on a connector end 45 aligns with each of the second threaded holes 35 of each fastener 30 so that a connector bolt 48 can extend through the fasteners 30 and the anchoring means 40. The connector bolt 48 extends through the second threaded holes 35 and the connector hole 44, sandwiching the anchoring means 40 between the fasteners 30. The fasteners 30 remain flush to the flat bar member 42 on both sides. Threads of the connector bolt 48 are covered within the second threaded holes 35 to prevent exposure of the connector bolt 48 to tampering and being unscrewed. The connector bolt 48 can pass through one second threaded hole 35, the connector hole 44, and then remain covered in another second threaded hole 35 of another fastener 30. The connector bolt 48 can be shown as a conventional bolt or Allen button head bolt with a hex nut in FIGS. 1 and 2, but the connector bolt 48 is more accurately an anti-theft control bolt. It should not be easy tamper with the anti-theft control bolt 48. In other embodiments, the connector bolt 48 is welded during installation for more permanent attachment. Special tools or lengthy time would be required to remove the connector bolt/anti-theft control bolt 48 in the embodiments of the present invention.

As shown in the figures, after being connected to the locking means 20 and the equipment, the present invention secures the equipment at the anchoring end 47 of the bar member 42. FIGS. 1 and 2 show the anchoring hole 46 as a plurality of anchoring holes 46. The anchoring holes 46 are longitudinally aligned and spaced along the anchoring means 40. In some embodiments, there is an additional stabilizing bar 50 bolted to the flat bar member 42 at the anchoring end 46 by a stabilizing bolt 54. FIG. 1 shows an embodiment with the stabilizing bar 50. In further embodiments, the stabilizing bar 50 can have a plurality of mounting holes 52 longitudinally aligned and spaced along the stabilizing bar 50. In still further embodiments, a section of rebar can be inserted through the anchoring holes 46 or the mounting holes 52 or both.

The anchoring end 47 is permanently mounted in place. FIGS. 1 and 2 show the embodiment for a poured concrete plug 60 for outdoor equipment. The connection space 36 and the pivoting attachment at the connector hole 44 and the second threaded holes 35 allow for adjusting to the height or depth required for various sizes of equipment. The angle of the bar member 42 is adjustable. For a poured concrete plug 60, concrete is set around the anchoring end 47 of the anchor means 40 and through the anchoring hole 45. When there is a plurality of anchoring holes 45, the concrete sets through all of the anchoring holes, forming an even stronger attachment. When there is a stabilizing bar 50, the concrete pours around the stabilizing bar 50 for added support and anchoring. When the stabilizing bar 50 has a plurality of mounting holes 52, a stronger anchoring is made to the concrete, which sets through the mounting holes 52 and the anchoring holes 45. When rebar is inserted through the anchoring holes 46 or the mounting holes 52 or both, the concrete plug 60 is even more strongly anchoring the system 10. The concrete plug 60 is an example for outdoor applications, such as the backflow preventer 14 of a sprinkler system 12. In alternative indoor applications, the anchoring end 47 is permanently affixed to heavy appliances or plumbing pipes. A heavy gun safe or big furniture can be secured with embodiments of the present invention.

Figure 4:
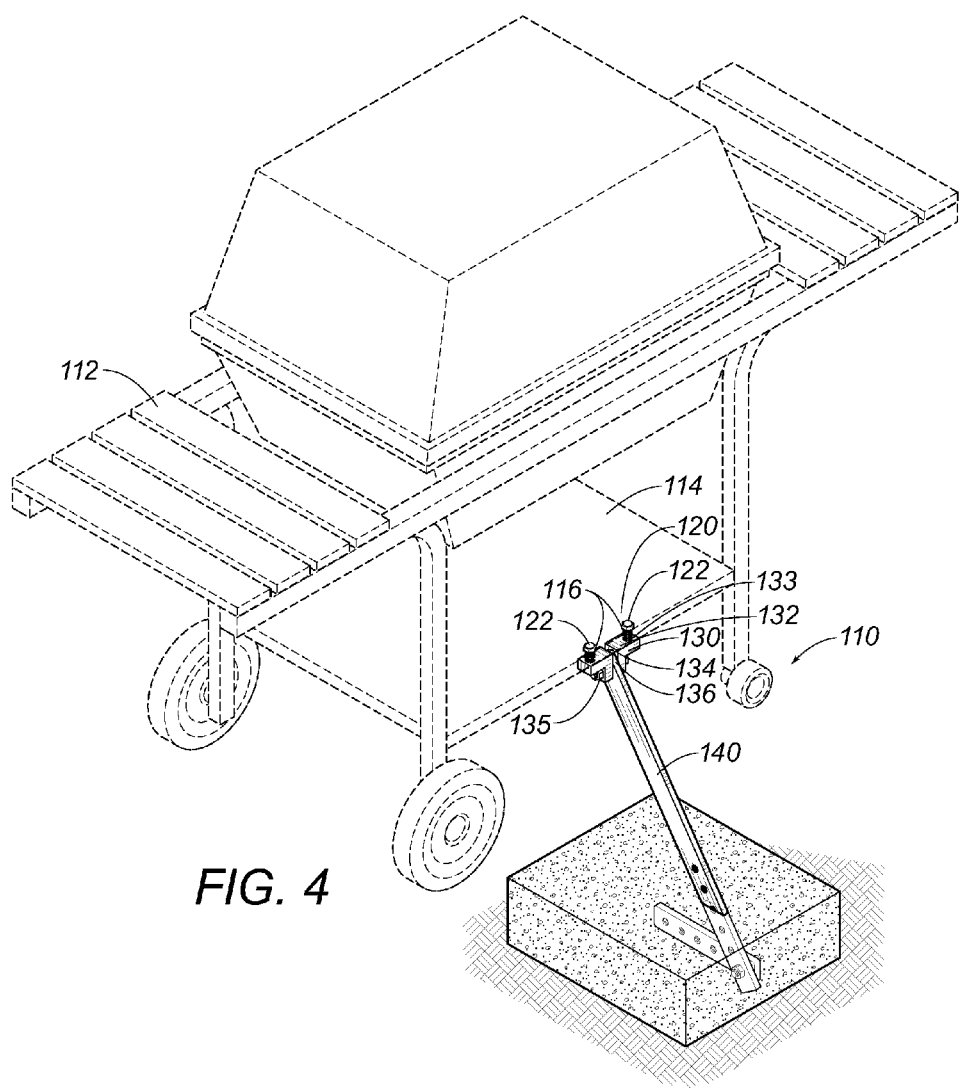
FIG. 4 is a schematic view of an alternative embodiment of the system for securing equipment, showing the equipment as a barbecue grill.

FIGS. 3 and 4 illustrate alternative embodiments of the system 110 of the present invention. FIG. 3 shows the system 110 for securing a park bench, and FIG. 4 shows the system 110 for securing a barbecue grill. The system 110 includes a locking means 120, a plurality of fasteners 130, and an anchoring means 140. The locking means 120 is attached to the equipment to be secured. The fasteners 130 connect the locking means 120 to the anchoring means 140. In this embodiment, the locking means 120 is comprised of a pair of locking bolts 122, and the equipment 112 to be secured has a locking surface 114 with a plurality of locking holes 116. For attachment, the locking holes 116 are in alignment with the plurality of fasteners 130. Each locking bolt 122 extends through the locking holes 116 through the locking surface 114 and threadedly engages the plurality of fasteners 130 through the first threaded holes 133 on the first surfaces 132. The locking bolts 122 face downward in a similar position as the locking bolt ends of the previous embodiment. The locking bolts 122 can be shown as a conventional bolt or Allen button head bolt with a hex nut in FIGS. 3 and 4, but the locking bolts 122 may also be anti-theft control bolts to prevent tampering. In other embodiments, the locking bolts 122 can be welded during installation for more permanent attachment. Special tools or lengthy time would be required to remove the locking bolts 122 in the embodiments of the present invention. The threads of the locking bolts 122 remain covered to prevent tampering as well. Any equipment 112 can have the locking surface 114 and plurality of locking holes 116, including a park bench, barbecue grill, soccer goal, or even a stand for a bicycle. The system 110 remains secure and adjustable to the height and depth of the various equipment. The equipment can be easily accessed for maintenance and use.

In the embodiment of FIGS. 3 and 4, each fastener 130 threadedly engages the locking means 120 on a first surface 132 through the first threaded hole 133. Each locking bolt 122 threadedly engages a first threaded hole 133 on a first surface 132 of each fastener 130 so that the threads of each locking bolt 122 are covered within the first threaded hole 133. Each locking bolt 122 is within a respective first threaded hole 133. The fasteners 130 prevent the locking means 20 from being unscrewed because the threaded surface is not exposed. Each fastener 130 on each locking bolt 122 also has a respective second surface 134 facing each other, and these second threaded holes 135 of each fastener 130 are in alignment with each other. A connection space 136 is formed between second surfaces 134 of each fastener 130 for alignment of the anchoring means 140. In embodiments of the present invention, each fastener 130 is also L-shaped, so that each fastener 130 is placed back to back on sides of the anchoring means 140, and the connection space 136 is defined by the second surfaces 134 of the fasteners 130. The anchoring means 140 is substantially the same as the embodiment of the anchoring means 40 in FIGS. 1 and 2 with similar functionality.

The present invention provides embodiments of a system for securing equipment. The system can be used for larger sized equipment, and the equipment can be secured outdoors or indoors. The system is adjustable to various heights and depths for connection to equipment and anchoring of the system. When secured outdoors, the embodiments of the system for securing equipment allow access to the equipment for inspection and maintenance. For example, for a backflow preventer of a sprinkler system, the valve and other parts can be inspected without requiring key access to an enclosure covering the device, while still remaining permanently secured to prevent theft. The embodiments of the system for securing equipment of the present invention also include fasteners, which permanently connect a locking means and an anchoring means. For each fastener, the first surfaces align with the locking means and the second surfaces align with the anchoring means. The fasteners are locking, so that they cannot be unscrewed, even though the fasteners are exposed on outdoor equipment. The arrangement of the first and second threaded holes further protect against dismantling the system because the locking means cannot be unscrewed while the anchoring means is attached.

The foregoing disclosure and description of the invention is illustrative and explanatory thereof. Various changes in the details of the illustrated structures, construction and method can be made without departing from the true spirit of the invention.

I claim:

1. A system for securing equipment, comprising:
   a locking means attached to said equipment to be secured;
   a plurality of fasteners, each fastener having a first surface in alignment with said locking means and a second surface orthogonal to said first surface, said first surface having a first threaded hole, said second surface having a second threaded hole, and first and second threaded holes being oriented orthogonal to each other, wherein each fastener threadedly engages said locking means on a first surface through said first threaded hole; and
   an anchoring means fixedly attached to said plurality of fasteners, said anchoring means engaging second threaded holes on second surfaces of each fastener,
   wherein said anchoring means is comprised of a flat bar member with a connector hole on a connector end and an anchor hole on an anchoring end, said anchoring means being positioned between the fasteners, and wherein said connector hole is aligned with second threaded holes of each fastener.

2. The system for securing, according to claim 1, wherein said locking means is comprised of a U-bolt with locking bolt ends, said U-bolt wrapping around said equipment to be secured, said locking bolt ends facing downward.

3. The system for securing, according to claim 2, said locking means further comprising:
   a collar mounted across said U-bolt, said collar wrapping around said equipment to be secured and across an open end of said U-bolt.

4. The system for securing, according to claim 2, wherein said locking bolt ends threadedly engage a respective fastener on a respective first surface of each fastener, and wherein threads of each locking bolt end are covered within a respective first threaded hole.

5. The system for securing, according to claim 2, wherein each fastener threadedly engages said U-bolt at said locking bolt ends, wherein each second surface of each fastener on each locking bolt end faces each other, each second threaded hole of each fastener being in alignment with each other, the fasteners forming a connection space between second surfaces of each fastener.

6. The system for securing, according to claim 1, wherein each fastener is L-shaped.

7. The system for securing, according to claim 1, further comprising:
   a connector bolt extending through the fasteners and the anchoring means, said connector bolt threadedly engaging through the second threaded holes and the connector hole, passing through one second threaded hole, said connector hole and another second threaded hole, wherein threads of said connector bolt are covered within the second threaded holes and said connector hole.

8. The system for securing, according to claim 1, further comprising a plurality of anchoring holes at said anchoring end, said anchoring holes being longitudinally aligned and spaced along said anchoring end.

9. The system for securing, according to claim 1, further comprising:
   a stabilizing bar bolted to said anchoring end through said anchor hole.

10. The system for securing, according to claim 9, said stabilizing bar having a plurality of mounting holes longitudinally aligned and spaced along the stabilizing bar.

11. The system for securing, according to claim 1, further comprising:
    a concrete plug poured around said anchoring means, permanently mounting said anchoring means in place.

12. A system for securing equipment, comprising:
    a locking means attached to said equipment to be secured;
    a first fastener having a first surface in alignment with said locking means and a second surface orthogonal to said first surface, said first surface having a first threaded hole, said second surface having a second threaded hole, and first and second threaded holes being oriented orthogonal to each other, wherein said first fastener threadedly engages said locking means on said first surface through said first threaded hole, said first fastener having an L-shape;
    a second fastener having a first surface in alignment with said locking means and a second surface orthogonal to said first surface of said second fastener, said first surface of said second fastener having a first threaded hole, said second surface of said second fastener having a second threaded hole, and first and second threaded holes of said second fastener being oriented orthogonal to each other, wherein said second fastener threadedly engages said locking means on said first surface of said second fastener through said first threaded hole of said second fastener, said second fastener having an L-shape; and
    an anchoring means fixedly attached to first and second fasteners, said anchoring means engaging second threaded holes on second surfaces of each fastener, said first and second fasteners being positioned with each second surface facing each other and each first surface facing said locking means, said anchoring means fitted between said first and second fasteners,
    wherein said locking means is comprised of locking bolt ends being in alignment with said first and second of fasteners, facing downward, and extending to respective first threaded holes for threaded engagement to said first and second of fasteners, and wherein each fastener on each locking bolt end has said second surfaces facing each other, each second threaded hole of each fastener being in alignment with each other, the fasteners forming a connection space between second surfaces of each fastener.

13. The system for securing, according to claim 12, wherein said anchoring means is comprised of a flat bar member with a connector hole on a connector end and an anchor hole on an anchoring end, said anchoring means being positioned between the fasteners, and wherein said connector hole is aligned with second threaded holes of each fastener, further comprising:
    an anti-theft control bolt extending through the fasteners and the anchor means, said anti-theft control bolt threadedly engaging through the second threaded holes and the connector hole, passing through one second threaded hole, said connector hole and another second threaded hole, wherein threads of said anti-theft control bolt are covered within the second threaded holes and said connector hole.

* * * * *